US010115276B2

(12) United States Patent
Rockwell et al.

(10) Patent No.: US 10,115,276 B2
(45) Date of Patent: *Oct. 30, 2018

(54) PORTABLE SECURITY SURVEILLANCE DEVICE

(71) Applicants: Phillip Flagg Rockwell, Tampa, FL (US); David Keefe Rockwell, Tampa, FL (US)

(72) Inventors: Phillip Flagg Rockwell, Tampa, FL (US); David Keefe Rockwell, Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/404,613

(22) Filed: Jan. 12, 2017

(65) Prior Publication Data

US 2017/0124822 A1 May 4, 2017

Related U.S. Application Data

(63) Continuation of application No. 15/078,535, filed on Mar. 23, 2016, now Pat. No. 9,578,261.

(60) Provisional application No. 62/137,520, filed on Mar. 24, 2015.

(51) Int. Cl.
| | |
|---|---|
| *H04N 7/18* | (2006.01) |
| *G03B 17/00* | (2006.01) |
| *H04N 5/28* | (2006.01) |
| *G08B 13/196* | (2006.01) |
| *H04N 5/225* | (2006.01) |

(52) U.S. Cl.
CPC . *G08B 13/19621* (2013.01); *G08B 13/19656* (2013.01); *G08B 13/19684* (2013.01); *G08B 13/19695* (2013.01); *H04N 5/2252* (2013.01); *H04N 5/28* (2013.01); *H04N 7/181* (2013.01); *H04N 7/185* (2013.01); *H04N 7/186* (2013.01)

(58) Field of Classification Search
CPC .......... H04N 7/186; G06T 2207/30232; G06B 13/19617
See application file for complete search history.

(56) References Cited

U.S. PATENT DOCUMENTS

| | | |
|---|---|---|
| 6,744,463 B2 | 6/2004 | Rye et al. |
| 7,583,191 B2 | 9/2009 | Zinser |
| 7,687,678 B2 | 3/2010 | Jacobs |
| 7,868,912 B2 | 1/2011 | Venetianer et al. |
| 8,142,700 B2 | 3/2012 | Sitti et al. |

(Continued)

*Primary Examiner* — Rebecca A Volentine

(74) *Attorney, Agent, or Firm* — Andriy Lytvyn; Smith & Hopen, P.A.

(57) ABSTRACT

A multifunctional portable surveillance device having a strap and a first and second end modules disposed on the opposite ends of the strap. A first electronic device resides within the first end module, and the second electronic device resides within the second end module. The strap is configured to straddle an object, whereby the first and the second electronic devices are positioned on the opposite sides of the object. The surveillance device has a control unit. The device further includes a sensor configured to detect a predefined event. A network of connectors resides within the strap, the connectors configured to carry electric signals between the first electronic device, the second electronic device, the sensor, and the control unit. Responsive to detecting a predefined event through a sensor, the control unit actuates the first electronic device, the second electronic device, or both.

21 Claims, 7 Drawing Sheets

(56) References Cited

U.S. PATENT DOCUMENTS

| | | |
|---|---|---|
| 8,780,201 B1 | 7/2014 | Scalisi et al. |
| 8,997,389 B2 | 4/2015 | Folk |
| 9,199,606 B1 | 12/2015 | Van Wiemeersch et al. |
| 2006/0139449 A1* | 6/2006 | Cheng .................. H04N 7/186 348/61 |
| 2007/0201847 A1* | 8/2007 | Lei .................... G02B 27/0093 396/51 |
| 2008/0239080 A1* | 10/2008 | Moscato .............. A42B 3/0426 348/148 |
| 2013/0196831 A1 | 8/2013 | Kinsbourne et al. |
| 2013/0252552 A1 | 9/2013 | Vitkus et al. |
| 2014/0034801 A1 | 2/2014 | Kim |
| 2014/0093230 A1* | 4/2014 | Hale ..................... F16M 13/04 396/423 |
| 2014/0171751 A1 | 6/2014 | Sankman et al. |
| 2015/0174806 A1 | 6/2015 | Wong et al. |
| 2015/0237771 A1 | 8/2015 | Natter et al. |
| 2017/0171515 A1* | 6/2017 | Pender .................. H04N 7/185 |

* cited by examiner

PORTABLE SECURITY SURVEILLANCE DEVICE

PRIORITY CLAIM

This non-provisional application is a continuation of U.S. Non-Provisional Patent Application Ser. No. 15/078,535 entitled "Portable Security Surveillance Device" filed Mar. 23, 2016, which claims priority to U.S. Provisional Patent Application Ser. No. 62/137,520 filed Mar. 24, 2015 entitled "Door Mounted Computing Device."

BACKGROUND OF THE INVENTION

1. Field of the Invention

This invention relates to a security device. More specifically, it relates to a multifunctional portable security surveillance device.

2. Brief Description of the Related Art

In the modern world, security concerns present a serious threat. In the recent years, home surveillance, monitoring, and alarm technologies have become widespread. Most currently available security systems suffer from significant flaws, such as lack of portability, difficult installation and operation, and reliance on extraneous computing devices and monitors.

An example of a home surveillance system is disclosed in U.S. Pat. No. 6,744,463. Surveillance systems of this type utilize a plurality of video cameras each transmitting a video feed to a monitor. Although this type of a security system may be effective for some settings, it has major drawbacks for personal home use. First, the initial setup and installation procedures may be complicated and will likely necessitate services of a trained professional. Second, security systems of this type lack portability. Third, the security system requires a television set or a monitor for viewing the video feed.

Another type of home security system is disclosed in U.S. Pat. No. 8,780,201. This type of security systems eliminates the need for a dedicated monitor by enabling the security device to directly communicate with a smartphone, tablet, laptop, or another computing device through the Internet. This type of security system involves a doorbell-like device that is permanently mounted onto the door, thereby, rendering the device unfit for portable use. For example, an individual concerned with his or her safety while staying at a hotel room will not be able to pack the device disclosed in the '201 Patent in the suitcase and quickly deploy the device at the hotel room door. In addition to lack of portability, this device cannot be used in areas where the user does not have an access to the Internet. Furthermore, the device of the type disclosed in the '201 Patent cannot be used without a smartphone or a computing device, which significantly undermines its utility for people who do not possess such devices or are not well-versed in computing technology.

Accordingly, there exists an unmet need for a portable security device that can be easily deployed over any door or another object. Furthermore, there exists an unmet need for a standalone security device that does not require any extraneous computing or visual output devices.

SUMMARY OF THE INVENTION

The long-standing but heretofore unfulfilled need for a multifunctional portable security device capable of standalone operation is now met by a novel, useful, and non-obvious invention.

The security device has a strap and two end modules attached thereto. The strap is configured to straddle an object, so that the first end module resides on a first surface of the object, while the second end module resides on the second, opposite surface of the object. The first end module houses a first electronic device, and the second end module houses a second electronic device. In an embodiment, the first electronic device is an input device, and the second electronic device is an output device.

The security device further includes a control unit. A network of electrical connectors is disposed within the strap. The electrical connectors connect the first electronic device and the second electronic device to the control unit. The security device further includes a sensor in electrical communication with the control unit. The sensor is configured to measure a predetermined property. The sensor sends electric signals corresponding to a measurement of the predetermined property to the control unit. The control unit analyzes the input received from the sensor, and responsive to detecting that the signal meets a predetermined criterion, the control unit actuates the first and/or the second electronic devices.

In an embodiment, the first electronic device is an input device, while the second electronic device is an output device. In an embodiment, the first electronic device is a camera, and the second electronic device is a projector. In this embodiment, the camera captures images or video of events occurring on the first side of the object onto which the security device is deployed, and the projector outputs the captured images or video onto the second surface of the object. This feature allows an observer looking at one surface of the object to observe events occurring on the opposite side of the object.

In an embodiment, the sensor is a vibration sensor. The vibration sensor detects vibrations within the object and transmits corresponding electric signals to the control unit. The control unit processes the electric signals and, upon determining that they correspond to a predetermined criterion, actuate the first and/or second electronic devices.

A layer of dry adhesive may be disposed on the strap, the first end module, the second end module, or a combination thereof. The dry adhesive retains the security device in place after its deployed onto the object.

The security device may further contain additional electronic devices disposed within the first end module, the second end module or both. Additional electronic devices are in electrical communication with the control unit. The additional electronic devices are selected from the group consisting of a camera, a motion sensor, a projector, a proximity sensor, a microphone, a speaker, a global positioning system (GPS) receiver, a biohazard detector, an infrared sensor, a temperature sensor, a pressure sensor, a humidity sensor, a gesture recognition device, and a combination thereof.

In an embodiment, the security device has a wireless network adapter configured to connect to a wireless data network. The security device can receive and transmit data via the Internet. In an embodiment, the security device may be wirelessly connected to a computing device, such as a smartphone, thereby enabling the user to remotely control the security device and view data captured therefrom.

In an embodiment, the first end module, the second end module, or both are detachable from the strap, thereby enabling a user to select a module containing an appropriate electronic device/sensor for a user-selectable application.

In an embodiment, the strap of the security device is configured to be deployed over a door. In that embodiment, the thickness of the strap is less than 0.5 inches thereby permitting the strap to reside within a gap between the door and a door frame. The first end module resides on the exterior surface of the door, while the second end module resides on an interior surface of the door. In an embodiment, a camera is housed within the first end module, and a projector is housed within the second end module. Responsive to the sensor transmitting an electric signal to the control unit satisfying a predefined criterion, the control unit actuates the camera. The network of electrical connectors disposed within the strap permits the data captured by the camera to be transmitted to the projector. In an embodiment, the projector outputs images/video onto the inner surface of the door using it as a screen. This feature enables an observer to observe objects, people, and events on the opposite side of the door while the door remains in a closed configuration.

The security device may further include a proximity sensor, a density sensor, or both. The control unit analyzes electric signals received from the proximity sensor and/or the density sensor and determines whether the door is in a first open state or in a second closed state and can determine the exact angle of the door with respect to the frame. The state of the door enables the control unit to analyze with a higher degree of accuracy the signals received from the sensors and actuate an appropriate electronic device to perform a corresponding function.

DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and structural changes may be made without departing from the scope of the invention.

Figure 1A:
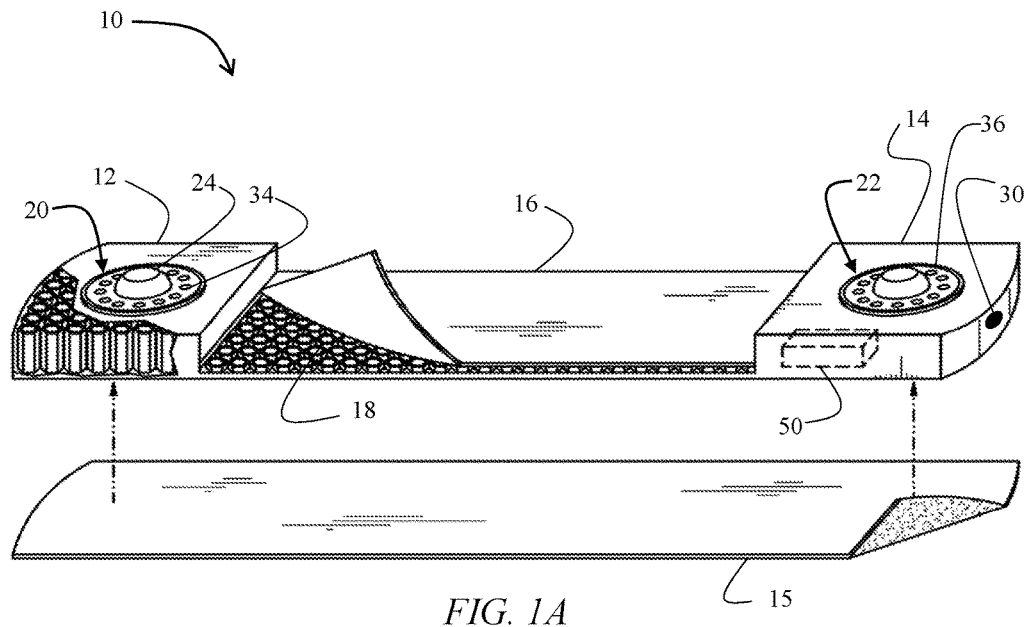
FIG. 1A is a perspective view of an embodiment of the security device.

The multifunctional security device 10 is depicted in FIG. 1A. Security device 10 has a first end module 12 and a second end module 14. End modules 12 and 14 are connected to the first and second ends of a flexible strap 16. A layer of dry adhesive 15 may be disposed on strap 16 and/or first and second end modules 12 and 14, thereby enabling security device 10 to be securely attached to and easily detached from virtually any surface.

A network of electrical connectors 18 is disposed within strap 16. In an embodiment, network of electrical connectors 18 is an artificial neuron network, commonly referred to as a neuronet. A first cluster of sensors 20 is housed within the first end module 12. A second cluster of sensors 22 is housed within the second end module 14. The first and second sensor clusters 20 and 22 are in electrical communication with one another via electrical connectors 18.

Sensor clusters 20 and 22 include a plurality of various sensors and electronic components. In an embodiment depicted in FIG. 1B, first and second end modules are detachable from strap 16. This modularity enables the user to select end modules 12 and 14 having sensor clusters 20 and 22 suitable for a particular application. This feature significantly increases versatility of security device 10 by enabling the user to select the data security device 10 captures and outputs by interchanging end modules 12 and 14. Thus, security device 10 may be customized, upgraded, or modified to have different capabilities and perform various functions simply by interchanging end modules 12 and 14.

A control unit 50 resides within security device 10. Control unit 50 receives electric signals from first and second sensor clusters 20 and 22 via electrical connectors 18. Control unit 50 operates under a set of instructions which analyze the input received from sensor clusters 20 and 22. Responsive to the input meeting a predefined condition, control unit 50 actuates predetermined electronic components listed above. For example, responsive to detecting a dangerously high temperature, control unit 50 may actuate speaker 36 to produce an audible alarm.

Figure 1B:
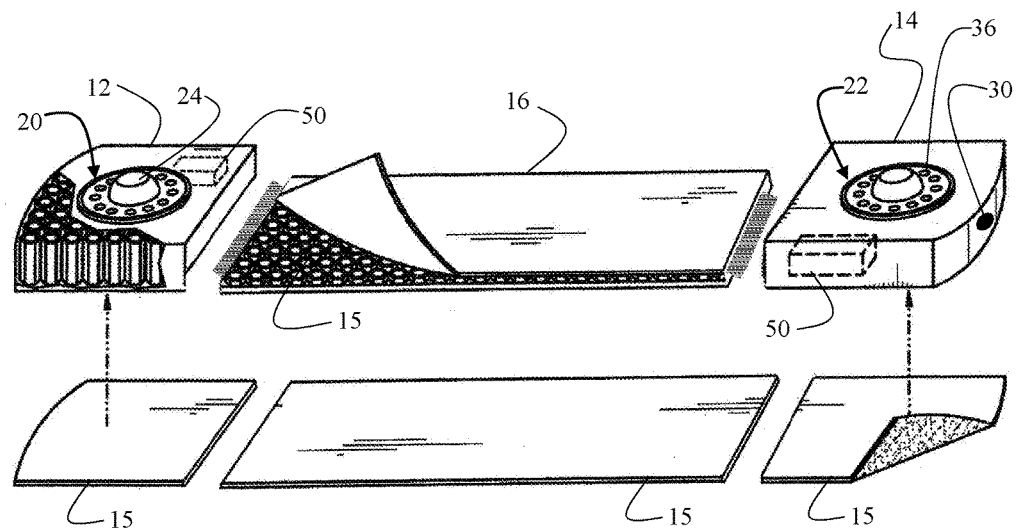
FIG. 1B is a perspective view of an embodiment of the security device having detachable first and second end module.

In an embodiment depicted in FIG. 1B, each end module 12 and 14 has a dedicated control unit 50. This feature allows each control unit 50 to be preprogrammed based on the types of sensors within the sensor cluster of that particular module, therefore, making each module ready for operation without requiring any additional programming or setup. For example, according to this embodiment, the user may purchase a "video and audio surveillance" module, which will be preconfigured with all necessary sensors and control unit 50 operating under a set of instructions appropriate for that specific functionality.

Figure 2:
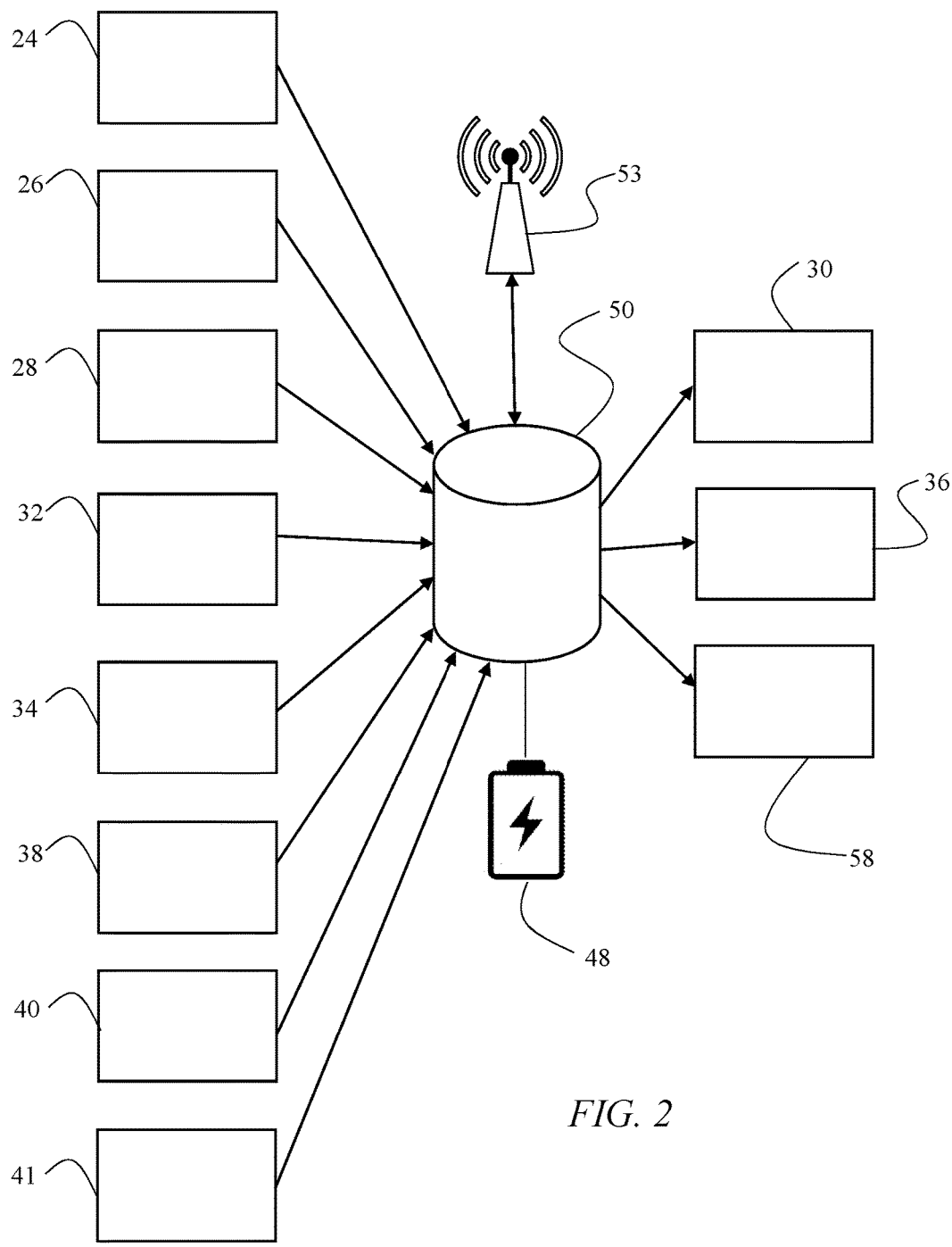
FIG. 2 is a schematic diagram of the security device.

FIG. 2 illustrates some examples of sensors and electronic devices that may be used in first and second sensor clusters 20 and 22. There are two broad categories of these devices: input devices and output devices. Sensors are input devices because they are configured to collect data and transmit that data to control unit 50. Some examples of input devices and sensors are as follows: a camera 24, a vibration sensor 26, a motion sensor 28, a proximity sensor 32, a microphone 34, a global positioning system (GPS) receiver 38, a biohazard detector 40, and other sensors adapted for measuring various environmental conditions including temperature, pressure, and humidity 41, etc. Some examples of output devices are as follows: a projector 30, a speaker 36, a haptic output device 58, etc. In an embodiment, sensors may also reside within the strap 16. For example, strap 16 may contain a load cell, a density sensor, a proximity sensory, etc.

FIG. 2 further depicts a power source 48 supplying an electric current to control unit 50. Although not depicted in FIG. 2, a person of ordinary skill in the art will understand that the power source 48 also supplies electric current to the electronic components of first and second sensor clusters 20 and 22. A person of ordinary skill in the art will further understand that multiple power sources 48 may be used depending on the configuration of security device 10. Power source 48 may be disposed within first end module 12, second end module 14, strap 16, or a combination thereof. In an embodiment, power source 48 may be a battery, a photovoltaic cell, or a fuel cell. In an alternative embodiment, power source 48 may be an electrical power supply, such as an alternating current electrical outlet.

Figure 3:
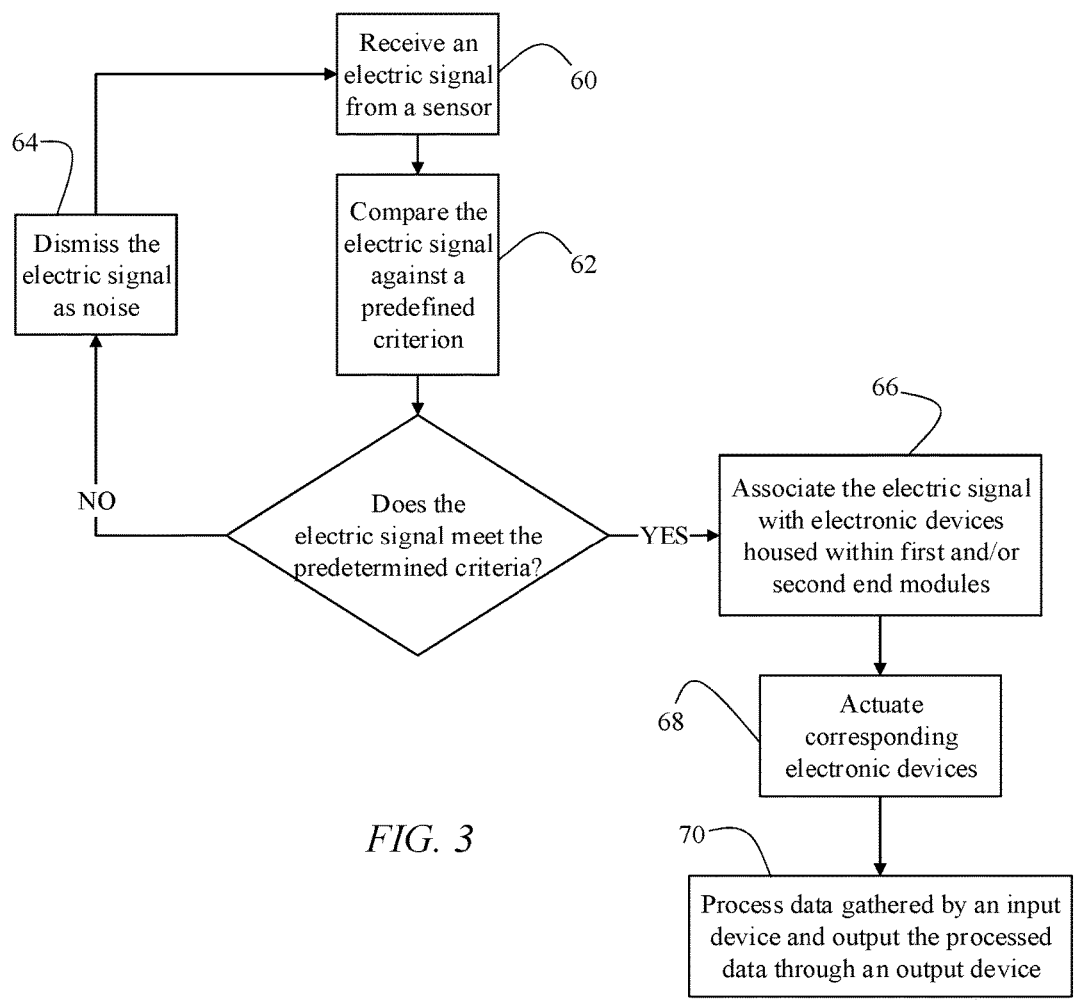
FIG. 3 is a flowchart illustrating a principle of operation of the security device.

A fundamental principle of operation of security device 10 is schematically illustrated in FIG. 3. In its default configuration, security device 10 is in an idle state to preserve energy, in which most output and input devices within sensor clusters 20 and 22 are powered down. A sensor measuring a particular property transmits an electric signal to control unit 50 in step 60. In step 62, control unit 50 determines whether the input received from the sensor meets a predefined criterion. If the signal does not meet the criterion, it is considered noise and is dismissed in step 64. If an input from the sensor satisfies a predefined criterion, in step 66, control unit 50 identifies electric devices and/or sensors within sensor clusters 20 and 22 corresponding to the input. Control unit 50 actuates the identified electronic devices in step 68. In step 70, control unit 50 processes the data received from the actuated electronic devices and outputs the processed data through one or more output devices.

Figure 4:
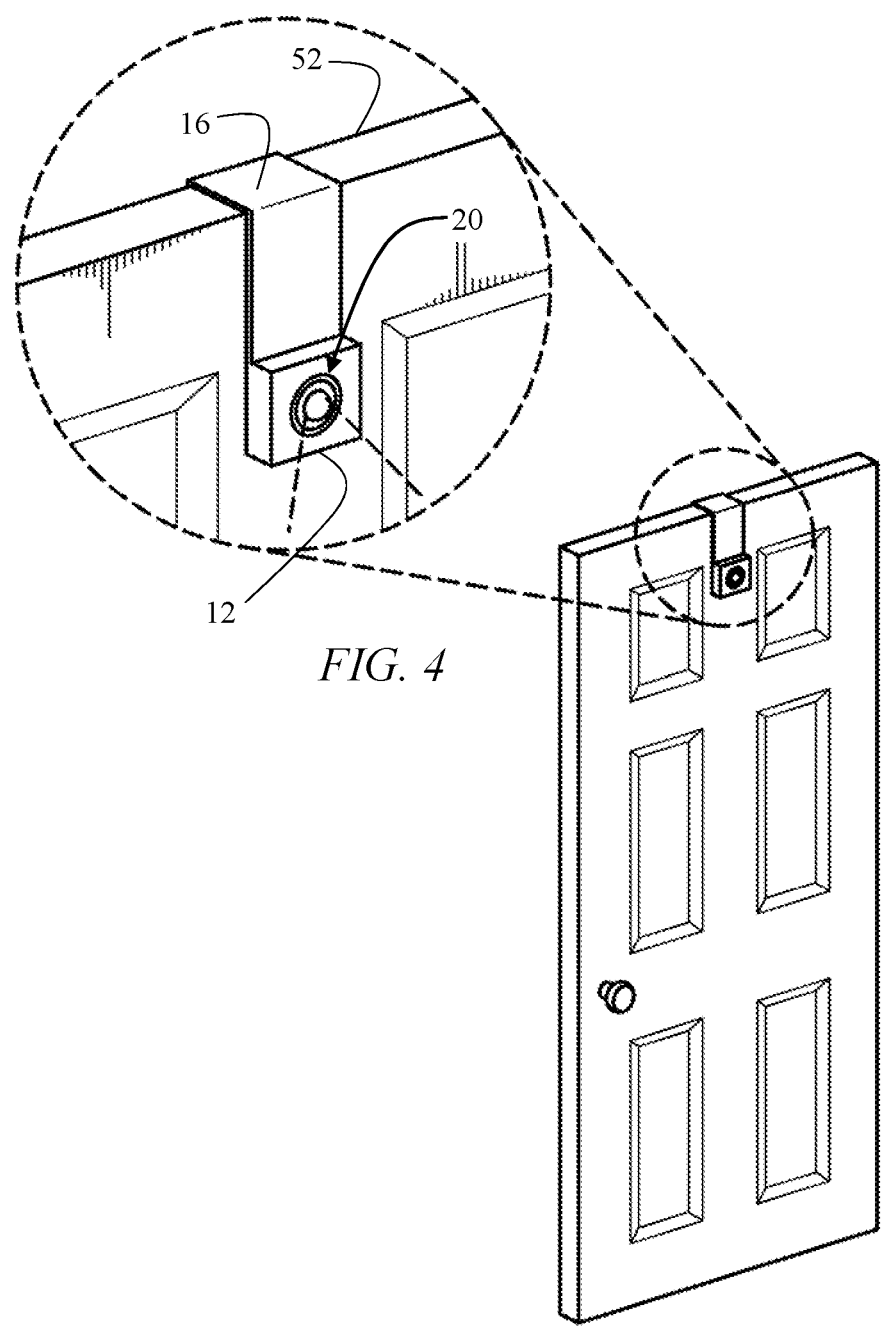
FIG. 4 is an isometric view of an embodiment of the security device configured for deployment over a door.
Figure 5A:
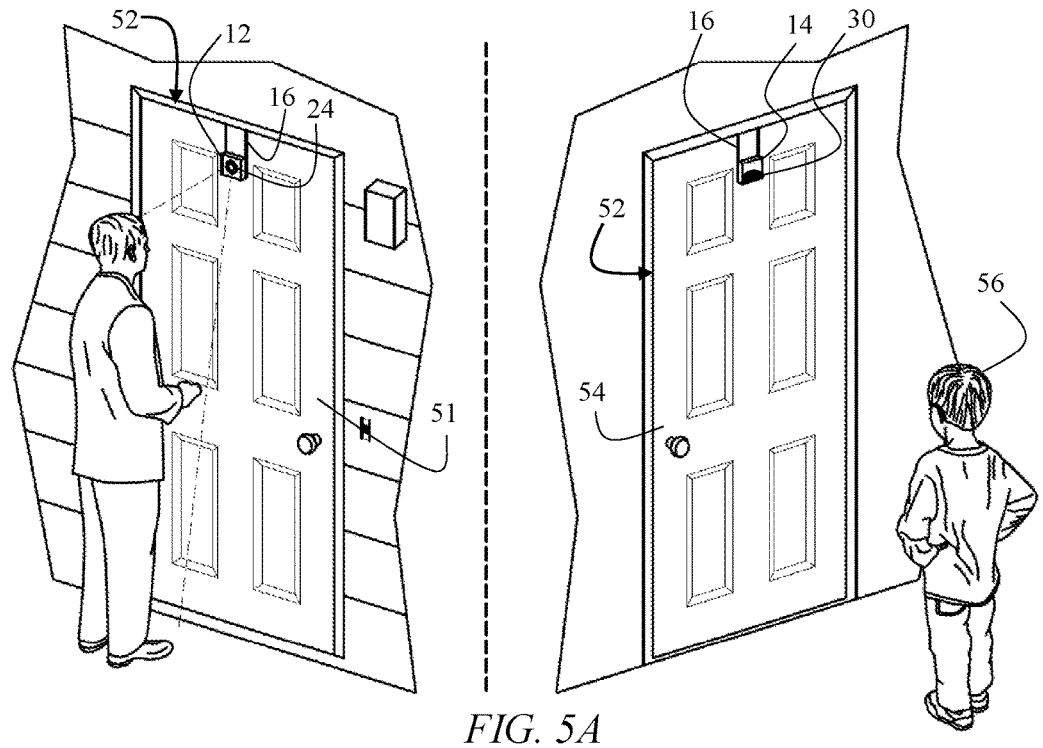
FIG. 5A is a perspective view of the interior and exterior sides of the door on which the security device is deployed.
Figure 5B:
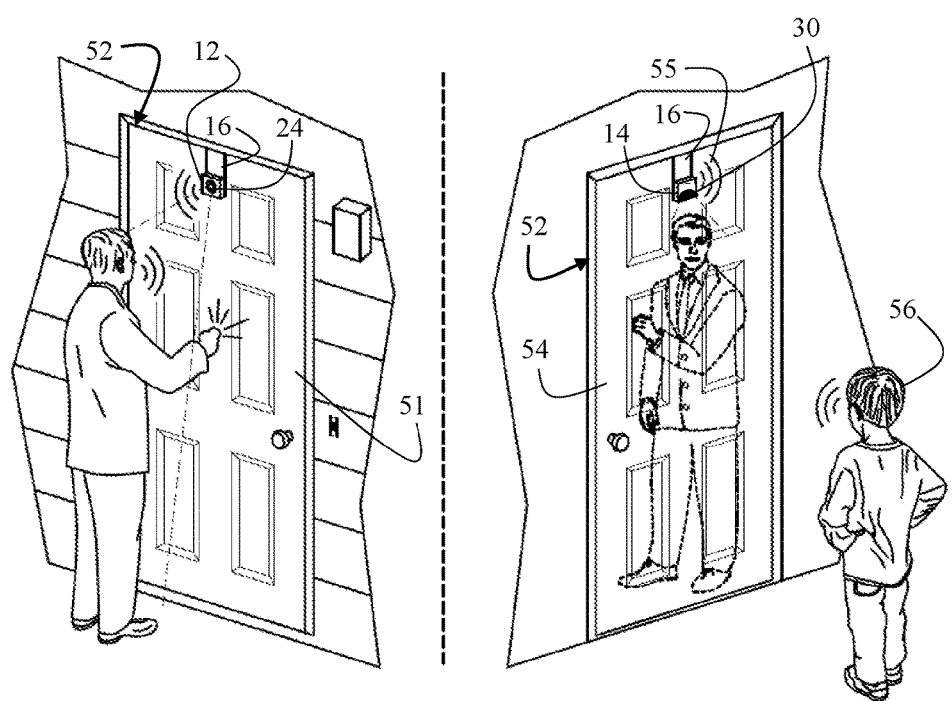
FIG. 5B is a perspective view of the interior and exterior sides of the door depicting the security device being actuated responsive to a knock on the door.

In an embodiment of security device 10 depicted in FIGS. 4 and 5A-B, security device 10 is configured such that strap 16 straddles a door 52, whereby first end module 12 is disposed on the exterior side 51 of door 52 and second end module 14 is disposed on the interior side 54 of door 52. In this embodiment, camera 24 is housed within first end module 12, and projector 30 is housed within second end module 14. Camera 24 is configured to capture images and/or video of the environment outside door 52, as depicted in FIG. 5A.

In an embodiment, security device 10 includes vibration sensor 26. Vibration sensor 26 monitors door 52 for any vibrations. Upon detecting a vibration, vibration sensor 26 transmits an electric signal to control unit 50. Control unit 50 queries the signal against a database and associates the detected vibration with one or more of the predefined events, such as a knock, a hard knock, a slam, a kick, etc. Responsive to determining the vibration event, control unit 50 activates predefined electrical components.

For example, in FIG. 5B, responsive to detecting a knock, control unit 50 may activate speaker 36 to produce an audible alarm 55—such as a doorbell sound—to alert user 56 that someone is knocking on door 52. Control unit 50 also activates camera 24 facing the exterior of door 52. Control unit 50 further activates video projector 30 on the interior side of door 52. Video projector 30 is configured to project a video feed captured by camera 24 onto the surface of door 52, thereby using it as a screen. This feature makes the door appear semi-transparent, thus enabling user 56 to observe the events, objects, and people on the other side of door 52 without having to open door 52. First and second sensor clusters 20 and 22 may each include microphone 34, speaker 36, camera 24, and projector 30, thereby allowing user 56 to communicate with individuals on the opposite side of closed door 52 whereby each participant can see images/video of one another projected onto the surface of door 52.

Figure 6:
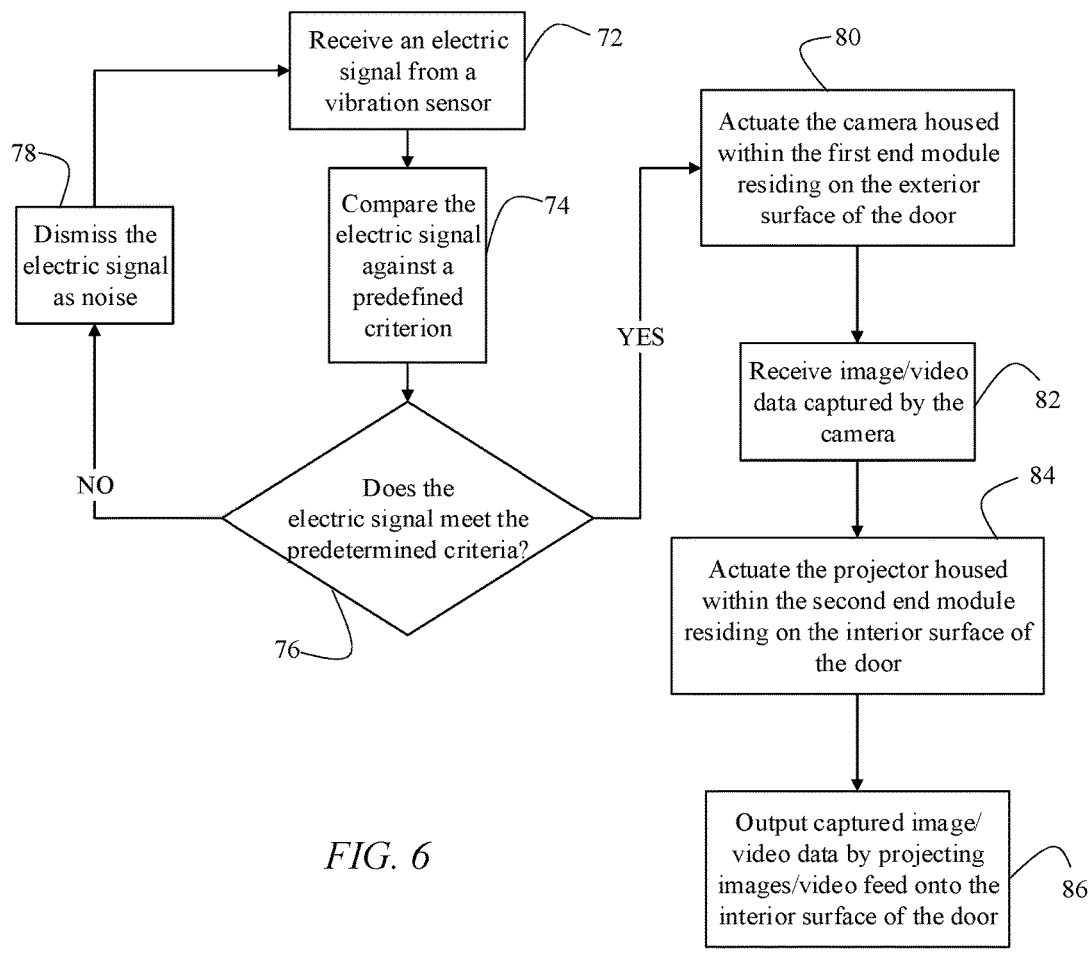
FIG. 6 is a flowchart illustrating principle of operation of the embodiment depicted in FIGS. 5A-B.

This functionality of security device 10 is illustrated in FIG. 6. In step 72, vibration sensor 26 transmits an electric signal to control unit 50 responsive to detecting a vibration of door 52. Control unit 50 compares the electric signal transmitted by vibration sensor 26 against a predefined criterion in step 74. In step 76, control unit 50 determines whether the signal meets the predefined criteria. If it does not, the signal is disregarded as noise in step 78. Responsive to the signal satisfying the predefined criteria, in step 80, control unit 50 actuates camera 24 housed within first end module 12 positioned on the exterior side of door 52. In step 82, control module 50 receives image and/or video data captured by camera 24. In step 84, projector 30 within second end module 14, which is positioned on the interior side of door 52, is actuated. In step 86, projector 30 projects an image/video onto the interior surface of the door using it as a screen, thereby permitting user 56 to observe events occurring on the opposite side of door 52 without having to actually open door 52. This feature of security device 10 enables user 56 to remain within the safety of the dwelling while observing and evaluating the situation occurring outside door 52.

In other embodiments, control unit 50 may be configured to take specific actions based on the input from vibration sensor 26. For example, audible alarm 54 may change depending on whether detected vibration correlates to a knock versus someone tampering with a lock or trying to force their way in. Furthermore, a proximity sensor, a density sensor, or both can be used to determine whether door 52 is in an open or closed state. Different actions are taken by control unit 50 depending on the state of door 52. For example, when door 52 is open, vibrations detected by vibration sensor 26 will vary from vibrations detected when door 52 is closed. State of door 52 is taken into account when querying input from vibration sensor 26 against a database to accurately determine the event correlated to the detected vibration and take an appropriate action.

Although security device 10 disclosed above is a stand-alone device not requiring any external components or connections, in an alternative embodiment, security device 10 includes a wireless network adapter 53 enabling security device 10 to connect to the Internet. In this embodiment, security device 10 can transmit data to a smartphone or a computer via the Internet to allow users to monitor their dwelling when away from home. Security device 10 can also receive various content from the Internet.

In an embodiment of security device 10, first sensor cluster 20 further contains a gesture recognition camera thereby enabling user 56 to interact with security device 10 via gestures. In an alternative embodiment, user 56 may interact with security device 10 via voice commands. In both of these embodiments, the user can receive visual output projected onto door 52 by projector 30 and provide input in response to the projected content. In addition, gesture recognition cameras and projectors 30 can be housed within both first and second end modules 12 and 14 to enable users on both sides of door 52 to observe images/video of one another and interact with one another. This feature allows security device 10 to transform an ordinary door 52 into an interactive system with an extensive utility for a wide array of applications including entertainment, gaming, video conferencing, educational materials, etc.

Figure 7A:
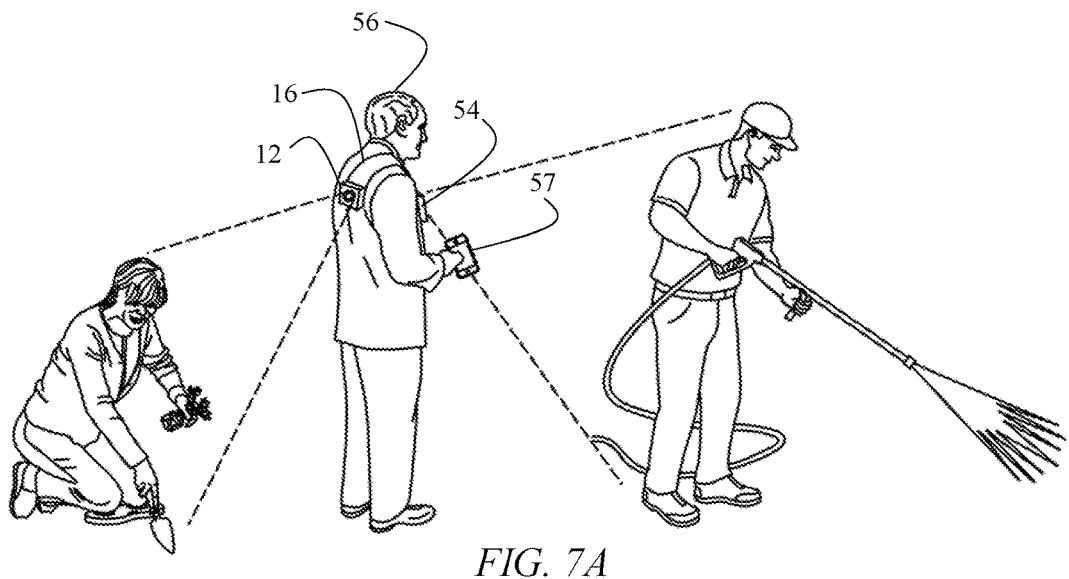
FIG. 7A is perspective view of a user using the security device in a wearable mode.
Figure 7B:
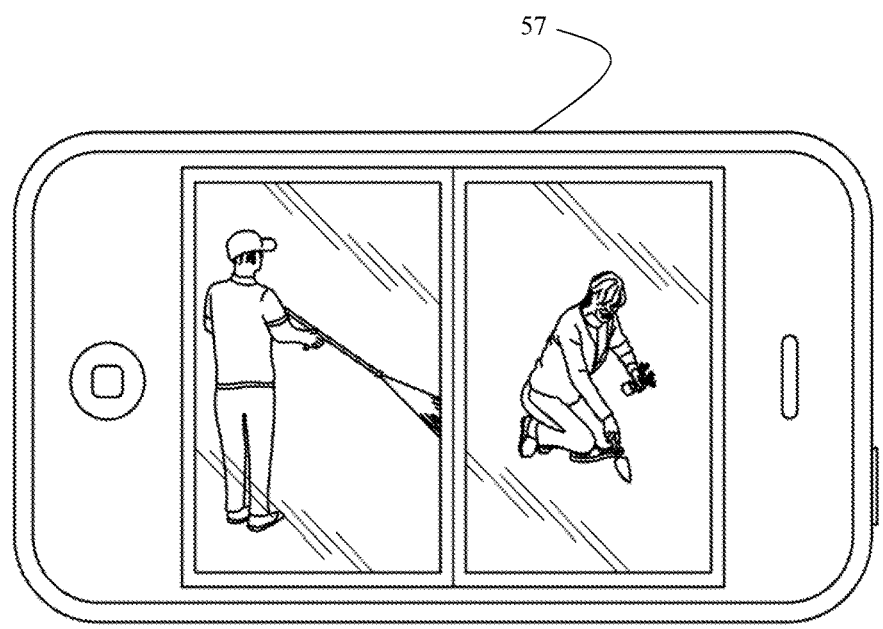
FIG. 7B is a front view of a computing device outputting images/video captured by the security device in the wearable mode depicted in FIG. 7A.

In yet another embodiment of the invention depicted in FIG. 7A, security device 10 may be worn by user 56. Due to the structural configuration of security device 10, first sensor cluster 20 will reside on the front of user 56 while second sensor cluster will reside on the back of user 56. This configuration enables security device 10 to simultaneously capture data pertaining to the environment in the front and the back of user 56 as shown in FIGS. 7A-B. FIG. 7B depicts a portable computing device 57 in communication with security device 10. This connection may be accomplished through a wired or wireless connection means known in the art. In this embodiment, user 56 receives information from security device 10 via the screen of portable computing device 57. User 56 can control electronic components and/or sensors in first and second sensor clusters 20 and 22 using portable computing device 57.

In the wearable mode disclosed above, security device 10 has extensive industrial applicability for law enforcement, tourism, data acquisition, and other applications. Security device 10 may further include a haptic output device 58 capable of non-verbally communicating information to user 56. For example, if control unit 50 determines a presence of a threat, haptic output device 58 can alert the user without raising any suspicion. Yet another application of this technology can be for navigation. Haptic output device 58 can direct user 56 to a predefined destination based on signals received from GPS receiver 38 and/or analysis of the surroundings captured by camera 24. Dry adhesive 15 ensures that security device 10 remains attached to user 56 as user 56 moves around.

In the embodiment of security device 10 adapted to be worn by user 56, projector 30 may be used to visually output information to user 56. Projector 30 may be configured to project a map image, a video, or other information onto a surface, such as a palm of hand or the ground in front of user 56. In alternative embodiment, security device 10 may include an integrated monitor screen. The monitor screen may be flexible and may be integrated into strap 16, thereby providing a compact and convenient means for user 56 to readily access information gathered by sensor clusters 20 and 22.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense. Although the above description refers to an electronic gadget, other types of electronic or non-electronic merchandise may be secured by the invention.

Glossary of Claim Terms

Camera—an optical electronic device configured to capture still images and/or video data.

Control unit—an electrical circuitry, such as a microprocessor, operating under a set of instructions enabling the control unit to receive and process input from electronic devices and sensors, actuate and control appropriate electronic devices, output data through output electronic devices, transmit data to a computing device, and perform other computational and control functions.

Electronic device—a device having an electrical circuitry and requiring electric current to perform its intended function.

End module—a module housing one or more electronic devices and/or sensors. End modules are disposed on the ends of the strap and are in electrical communication via the network of electric connectors disposed within the strap.

Input device—an electronic device configured to capture, measure, or otherwise obtain data and transmit an electric signal corresponding to that data to the control unit or another electronic device.

Output device—an electronic device configured to receive an electric signal and output the received signal in a form that can be perceived by the user, including audio, visual, and haptic.

Power source—an electronic device that supplies electric energy to the control unit and/or electronic devices disposed within end modules. Power source may be a battery, a photovoltaic cell, a fuel cell, or an alternating current power supply in a building.

Predefined event—a criterion for a property being measured by a sensor.

Projector—an optical electronic device configured to project an image and/or video onto a surface.

Sensor—a device that detects or measures a physical property and transmits an electric signal to the control unit communicating the measurement.

Strap—a strip of flexible material to which the first and second end modules are connected. The strap may contain a network of electrical connectors disposed therein to connect control unit and electronic devices and sensors housed within the end modules.

Vibration sensor—a sensor configured to detect and measure vibrations in an object on which the vibration sensor resides or is in a close proximity thereto.

What is claimed is:

1. A portable security surveillance device comprising:
   a saddle having a thickness, a first end, and a second end, the saddle configured to deploy over an object;
   a first end module disposed on the first end of the saddle, the first end module configured to reside on a first surface of the object;
   a second end module disposed on the second end of the saddle, the second end module configured to reside on a second surface of the object, whereby the saddle, the first end module, and the second end module collectively form an assembly, the saddle retaining the assembly in a deployed position wherein the first end module resides on the first surface of the object and the second end module resides on the second surface of the object, wherein the assembly is removable from the object by removing the saddle from the object, the first and the second surfaces of the object being unaltered by deployment and removal of the saddle;
   a first electronic device housed within the first end module, the first electronic device being an input device;
   a second electronic device housed within the second or first end module, the second electronic device being a data transmission device;
   a control unit in electronic communication with the first and the second electronic devices;
   a sensor in electronic communication with the control unit, the sensor configured to detect a predefined event and, responsive to detecting the predefined event, to transmit an electric signal to the control unit;
   a power source configured to supply an electric current to the control unit, the first electronic device, and the second electronic device; and
   a plurality of electrical connectors disposed within the saddle, the electrical connectors carrying electric signals between the power source, the control unit, the first electronic device, the second electronic device, the sensor, or a combination thereof;
   wherein responsive to the sensor detecting the predefined event, the sensor transmits an electric signal to the control unit, the control unit actuates the first electronic device and the second electronic device, whereby the second electronic device transmits data captured by the first electronic device.

2. The security device according to claim 1, wherein the sensor is a vibration sensor or a motion sensor and the predefined event is a vibration of the object or a motion sensor within a predefined range of the object.

3. The security device according to claim 1, wherein the first electronic device is a camera.

4. The security device according to claim 3, wherein the camera captures an image or a video feed to be transmitted via the second electronic device.

5. The security device according to claim 1, the second electronic device further comprising a transmitter, the transmitter configured to transmit data to a central hub, to other security devices, a computing device, or both.

6. The security device according to claim 1, further comprising the security device having a proximity sensor, a density sensor, or both in electrical communication with the control unit, whereby the control unit analyzes electric signals received from the proximity sensor, the density sensor, or both and determines whether the object is in a first open state or a second closed state.

7. The security device according to claim 1, further comprising additional electronic devices disposed within the first end module, the second end module or both in electrical communication with the control unit, the additional electronic devices are selected from the group consisting of a camera, a motion sensor, a projector, a proximity sensor, a microphone, a speaker, a global positioning system (GPS) receiver, a biohazard detector, an infrared sensor, a temperature sensor, a pressure sensor, a humidity sensor, a gesture recognition device, and a combination thereof.

8. The security device according to claim 1, further comprising a wireless network adapter configured to connect to a wireless data network.

9. The security device according to claim 1, further comprising a layer of dry adhesive disposed on the saddle, the first end module, the second end module, or a combination thereof.

10. The security device according to claim 1, wherein the first end module, the second end module, or both are detachable from the saddle, thereby enabling a user to select a module containing an appropriate electronic device for a user-selectable application.

11. A portable security surveillance device comprising:
    a saddle having a thickness, a first end, and a second end, the e configured to deploy over an object, the object having a first surface and a second surface opposite the first surface;

a first end module disposed on the first end of the saddle, the first end module configured to reside on the first surface of the object;

a second end module disposed on the second end of the saddle, the second end module configured to reside on the second surface of the object the saddle retaining the first and the second end modules in their deployed positions, whereby the first end module, the second end module, and the saddle form an assembly, the assembly being detachable from the object by removing the saddle therefrom, wherein the first and the second surfaces of the object are unaltered by deployment and removal of the saddle;

a first electronic device housed within the first end module;

a second electronic device housed within the second end module, wherein at least the first or the second electronic device is an input device;

a control unit in electric communication with the first and the second electronic devices;

a sensor in electronic communication with the control unit, the sensor configured to detect a predefined event and, responsive to detecting the predefined event, to transmit an electric signal to the control unit; and a plurality of electrical connectors disposed within the saddle, the electrical connectors carrying electric signals between the control unit, the first electronic device, the second electronic device, the sensor, or a combination thereof;

wherein responsive to the sensor detecting the predefined event, the sensor transmits an electric signal to the control unit, whereby the control unit actuates the first electronic device, the second electronic device, or both.

12. The security device according to claim 11, wherein the second electronic device comprises a transmitter in communication with the control unit, the transmitter configured to transmit data to a central hub, to other security devices, to a computing device, or a combination thereof.

13. The security device according to claim 11, wherein the first electronic device is a camera.

14. The security device according to claim 13, wherein the camera captures an image or a video feed transmission to the second electronic device.

15. The security device according to claim 11, wherein the sensor is selected from the group consisting of a vibration sensor, a proximity sensor, a motion sensor, and a density sensor.

16. The security device according to claim 11, wherein the first electronic device is selected from the group consisting of a camera, a motion sensor, a projector, a proximity sensor, a microphone, a speaker, a global positioning system (GPS) receiver, a biohazard detector, an infrared sensor, a temperature sensor, a pressure sensor, a humidity sensor, a gesture recognition device, and a combination thereof.

17. The security device according to claim 11, wherein the second electronic device comprises a wireless network adapter configured to connect to a wireless data network.

18. The security device according to claim 11, further comprising a layer of dry adhesive disposed on the saddle, the first end module, the second end module, or a combination thereof.

19. The security device according to claim 11, wherein the first end module, the second end module, or both are detachable from the saddle, thereby enabling a user to select a module containing an appropriate electronic device for a user-selectable application.

20. The security device according to claim 1, wherein the object is a door or a human body part.

21. The security device according to claim 11, wherein the object is a door or a human body part.

* * * * *